United States Patent [19]

Matsui et al.

[11] Patent Number: 4,908,649
[45] Date of Patent: Mar. 13, 1990

[54] AUTOMATIC FOCUS DETECTION DEVICE FOR USE IN A CAMERA

[75] Inventors: Toru Matsui; Toshihiko Karasaki, both of Sakai, Japan

[73] Assignee: Minolta Camera Kabushiki Kaisha, Osaka, Japan

[21] Appl. No.: 287,652

[22] Filed: Dec. 21, 1988

Related U.S. Application Data

[63] Continuation of Ser. No. 172,971, Mar. 22, 1988, abandoned, which is a continuation of Ser. No. 84,023, Aug. 11, 1987, abandoned.

[30] Foreign Application Priority Data

Aug. 12, 1986 [JP] Japan .................................. 61-188986

[51] Int. Cl.[4] .............................................. G03B 3/00
[52] U.S. Cl. .................... 354/403; 354/238.1
[58] Field of Search ............... 354/400, 403, 404, 440, 354/195.1, 195.12, 238.1, 271.1, 289.1, 267.1, 471

[56] References Cited

U.S. PATENT DOCUMENTS

| 4,067,030 | 1/1978 | Kuramoto et al. |
| 4,134,660 | 1/1979 | Sakurada et al. |
| 4,257,705 | 3/1981 | Hosoe et al. |
| 4,295,724 | 10/1981 | Sahara et al. ................ 354/238.1 |
| 4,327,976 | 5/1982 | Kagechika . |
| 4,462,669 | 7/1984 | Suzuki ........................... 354/400 |
| 4,494,847 | 1/1985 | Yamada ....................... 354/238.1 |
| 4,542,970 | 9/1985 | Suzuki et al. ................. 354/403 |
| 4,560,261 | 12/1985 | Ueda et al. ................ 354/195.12 |
| 4,609,274 | 9/1986 | Iwashita et al. ............. 354/442 |

FOREIGN PATENT DOCUMENTS

| 51-85718 | 7/1976 | Japan . |
| 51-110322 | 9/1976 | Japan . |
| 51-113621 | 10/1976 | Japan . |
| 53-33661 | 3/1978 | Japan . |
| 53-33662 | 3/1978 | Japan . |
| 54-126023 | 9/1979 | Japan . |
| 55-15154 | 2/1980 | Japan . |
| 56-149024 | 11/1981 | Japan . |
| 57-36570 | 8/1982 | Japan . |
| 62-49139 | 3/1987 | Japan . |

Primary Examiner—Russell E. Adams
Attorney, Agent, or Firm—Burns, Doane, Swecker & Mathis

[57] ABSTRACT

In a camera having an automatic focus detection device of active type, an auxiliary light source to project light to the object for the purpose of automatic focus detection is shared to a self-timer indicator.

4 Claims, 4 Drawing Sheets

AUTOMATIC FOCUS DETECTION DEVICE FOR USE IN A CAMERA

This application is a continuation of application Ser. NO. 172,971 filed Nov. 22, 1988 which is a continuation of application Ser. No. 084,023 filed Aug. 11,1987 now abandoned.

BACKGROUND OF THE INVENTION

1. FIELD OF THE INVENTION

The present invention relates to an automatic focus detection device for use in a camera for detecting a focus position of a photographic lens of the camera by radiating an auxiliary ray to an object.

2. DESCRIPTION OF THE PRIOR ART

In an automatic focusing control, when luminance of the object to be photographed is low, it is difficult to obtain a good automatic focus detection under an ambient light source. In order to improve this problem, there has been proposed to use an auxiliary ray of light emitted from an auxiliary light source to give a high luminance of the object so as to obtain a good result of the automatic focus detection easily. The automatic focusing device of the type mentioned above is called as an active type automatic focus detection device.

FIG. 1 is a schematic view for explaining the principle of the active type automatic focus detection device. The light beam reflected from the object passes through a photographic lens 71 and a semi transparent mirror disposed between the photographic lens 71 and a film surface S and is reflected by a total reflection mirror 73 coupled with the semi transparent mirror 72 and is focused on a light receiving unit 74 made of a plurality of light receiving elements. The defocus amount is calculated by detecting the relation of the positions of the focused images or the contrast of the images and the photographic lens is driven depending on said calculated defocus amount so as to control the focusing of the camera. In this case, the focus detection becomes impossible if the amount of the light beam reflected by the object is insufficient. Therefore, there has been proposed an automatic focus detection device of active type as shown in Japanese Patent Laid Opened No. 126023/1979, wherein there are provided an auxiliary light source 75 and a projection lens 76 for projecting a light beam from the auxiliary light source 75 onto the object and the focus detection can be executed by receiving the auxiliary rays of light projected to the object. The auxiliary light source 75 is desirably accommodated in the camera. But in practice, it is difficult to provide the light source 75 in the camera because such arrangement causes the camera body to be bulky. Therefore, the inventor of the present invention has proposed an automatic focus detection device, wherein the auxiliary light source is accommodated in a flash device but in this case the flash device should be always attached to the camera body.

Generally the wavelength of the auxiliary light for the purpose of the automatic focus detection (referred to as AF detection hereinafter) is approximately 700 nm, which is within the range of visible light for human eyes. However, the directivity of the auxiliary rays is made sharp for the purpose of focus detection so that in many cases the photographer can not confirm the light emission of the auxiliary light and it is undesirable to share the auxiliary light source with an indicator.

There is known another active type automatic focus detection device in which the auxiliary light source is modified. In Japanese Patent Laid Opened No.151507/1985, there is provided means for projecting non-spot rays which are weaker than spot rays to the object in a short distance so as not to injure the objected person's eyes by looking in at the strong spot rays beam from a short distance. In Japanese Patent Laid Opened No.193406/1984, there is provided a diffraction grating in the optical system of the projection rays beam and plural diffraction rays are projected to the plural objects so as to prevent the projection rays beam from passing through between the two objects for example in case the two objects are little far away, thereby obtaining a correct focus detecting. In the above-mentioned known arts, the auxiliary light sources are modified for the purpose of solving the disadvantages in the automatic focus detection of active type or inconvenient points in practical use. However, both prior arts mentioned above disclose only to use the light source for AF control and never suggest to share the light source for the AF control as another use.

SUMMARY OF THE INVENTION

The present invention is made in order to solve the above-mentioned problems and the object of the present invention is to provide an automatic focus detection device of active type in which the auxiliary light source for focus detection is shared with the self-timer indicator.

Another object of the present invention is to provide an automatic focus detection device for use in a camera with an auxiliary light source in which the camera can be manufactured without increasing the size of the camera.

A further object of the present invention is to provide a camera with an automatic focus detection device of active type in which the auxiliary light source for focus detection is shared with the self-timer indicator.

In order to accomplish the object mentioned above, according to the present invention there is provided an automatic focus detection device comprising mode switching means for switching between the ordinary photographic mode and the self-timer photographic mode and a radiation source driving circuit for turning the radiation source on and off in predetermined periods in the self-timer mode and for turning on the radiation source in the ordinary mode so that the radiation source is shared for the indicator of the operation of the self-timer.

According to the present invention, there is further provided a camera provided with an ordinary photographic mode and a self timer photographic mode in which an actual photographing is executed after a predetermined delay time from a provision of a trigger signal and a photographing optical system having a movable lens system for projecting an image of an object to be photographed onto a predetermined plane, an in-focus condition of the movable lens system being adjustable by moving said movable lens system, said camera comprising;
a light source accommodated in a body of the camera,
a light projecting system for projecting light from said light source to the object,
an automatic focus detection device for detecting in-focus condition of said photographing optical system by the light projected from said light projecting system, mode switching means for switching between the ordinary photographic mode and the self timer photographic mode, and a light source driving circuit being changeable in response to operation of the mode switching means between a mode for turning said light source on and off during the delay time of the self-timer photographic mode and a mode for turning on said light source for another predetermined time so as to project the light to the object for detecting the in-focus condition of the photographic optical system in the ordinary photographic mode.

DETAILED DESCRIPTION OF THE PREFERRED EMBODIMENT

Figure 1:
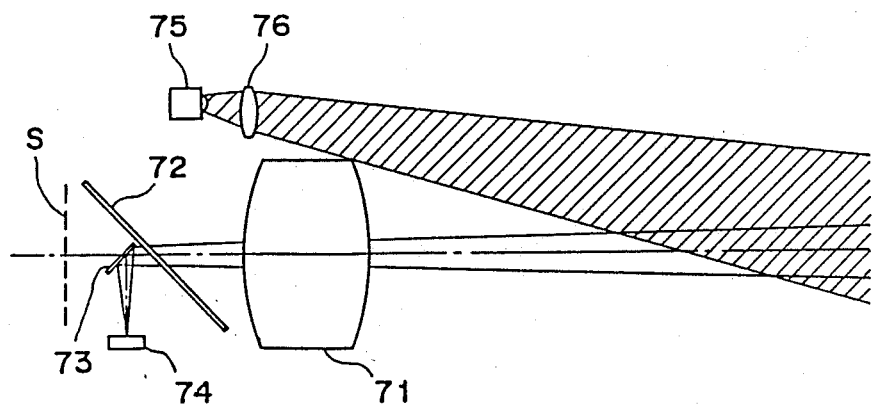
FIG. 1 is a schematic view showing a principle of an automatic focus detection of active type, FIG. 2 a schematic perspective view showing an embodiment of a camera comprising an automatic focus detection device of active type according to the present invention.
Figure 2:
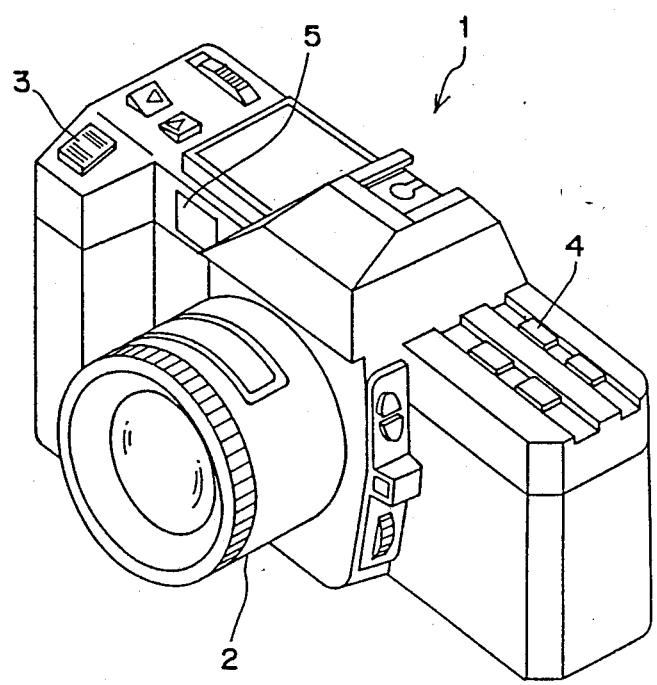

FIG. 2 is a perspective view of a camera showing an embodiment of an automatic focus control device of an active type according to the present invention.

Reference numeral 1 denotes a camera body, numeral 2 denotes a photographic lens, numeral 3 denotes a release button for shutter release and numeral 4 denotes a switching button for switching the photographic mode between an ordinary photographic mode and a photographic mode by using a self-timer. Moreover, in the camera body 1 there is provided a projection window 5 for projecting a ray of an auxiliary light to the object at the time of focus detection. The projection window 5 acts as a display unit for displaying the self-timer operation. The optical system inside the projection window 5 is explained with reference to FIG. 3.

Reference numeral 30 denotes a light source, in which light emitting diode (LED) radiating rays of light of 680 nm to 720 nm wavelength is preferably adopted. The above-mentioned wavelength of the light is selected in consideration of the degree of stimulus of the illumination for human eyes and the influence of the chromatic aberration of the photographic lens. If the degree of stimulus of the illumination is great for the human eyes, the object person may shut his eyes at the time of the illumination and the picture-taking of the person shutting his eyes is apt to be undesirably performed. In case infrared rays are adopted, the above-mentioned dazzling stimulus to the object person may be eliminated, but the influence of the chromatic aberration of the photographic lens becomes large. Particularly, it is difficult to control the dispersion of the light in the infrared range caused by the photographic lens and there is a fault that the yield of the photographic lens becomes worse. By these reasons, the rays of 680 nm to 720 nm wavelength as mentioned above are adopted as the light source 30.

Figure 3:
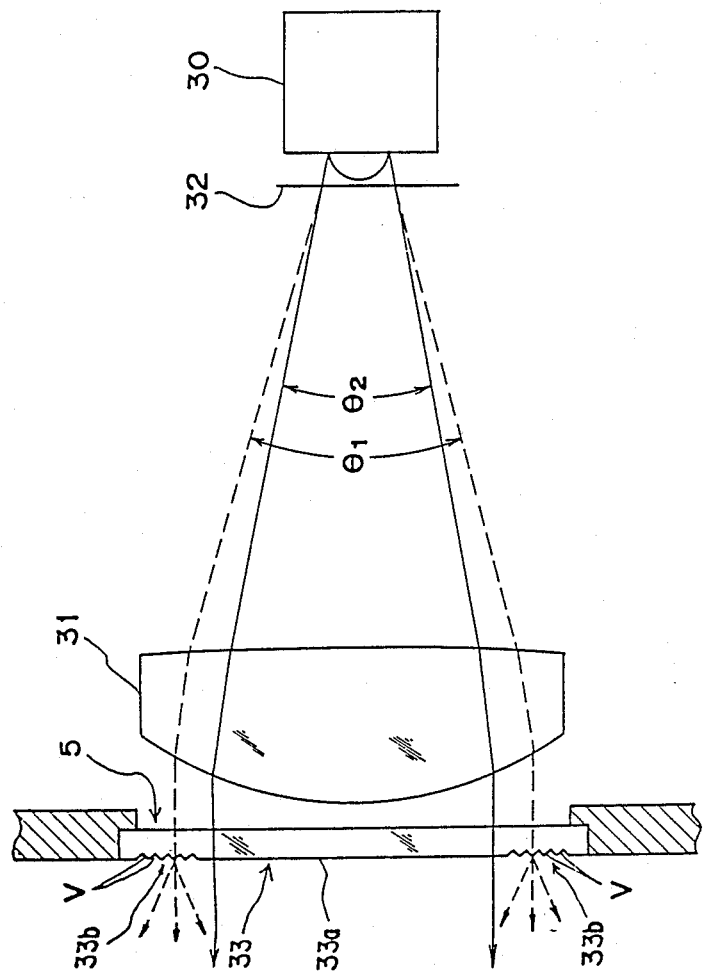
FIG. 3 is an enlarged schematic sectional view showing an embodiment of a projection portion of an auxiliary ray used in the camera shown in FIG. 2.

Reference numeral 31 denotes a projection lens which concentrates the rays radiated from the light source 30 and projects the rays to the object. Numeral 32 denotes a projection pattern disposed immediately in front of the radiation source 30 and substantially in the focus position of the projection lens 31 and by using the projection pattern 32, the object on which the rays of the light of the light source 30 is projected can be given a good contrast so as to facilitate the focus detection. Numeral 33 denotes a transparent panel fitted in the projection window 5 and the panel 33 has its central portion formed a plane portion 33a and its peripheral portion 33b formed a plurality of annular and coaxial grooves V. Among the rays radiated from the light source 30 in an angle $\theta_1$, the rays in the angle $\theta_2$ are refracted by the projection lens 31, the rays pass through the plane portion 33a of the transparent panel 33 as shown in FIG. 3 and are projected to the object. The above-mentioned rays within the angle $\theta_2$ are used as the auxiliary rays for the focus detection in case the brightness of the object is low. On the other hand, the rays in the range between the projecting angles $\theta_1$ and $\theta_2$ pass through the projection lens 31 and enter the peripheral portion 33b of the transparent panel 33 and are scattered by the grooves V formed on the peripheral portion 33b. Therefore, the object person can confirm the radiance of the projection window 5 of a camera by the scattered rays even though the object person does not position in front of the camera, so that he can confirm the operation of the self-timer.

Figure 7:
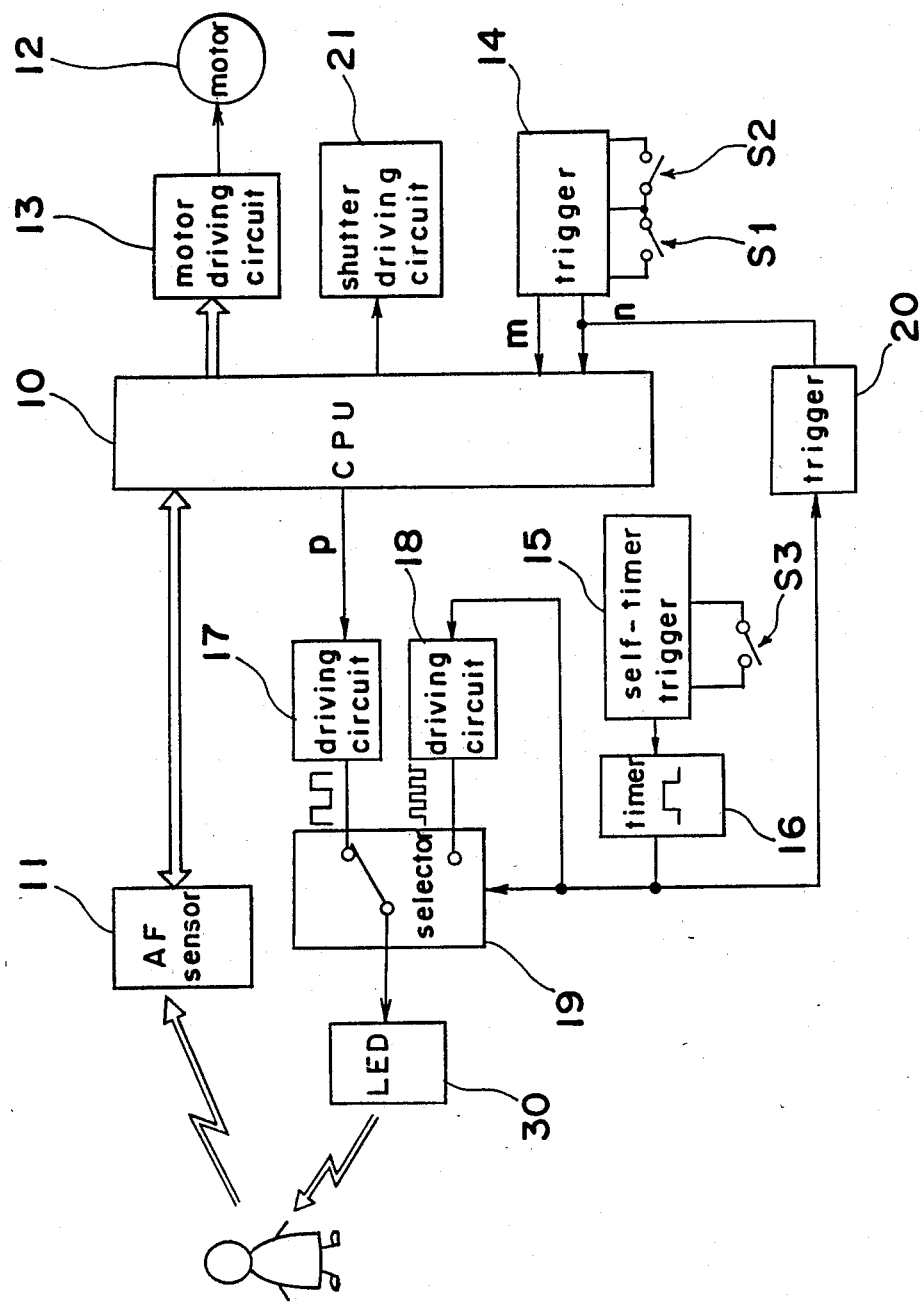
FIG. 7 is a block diagram showing an embodiment of a control circuit of the camera comprising the automatic focus detection device of active type according to the present invention.

FIG. 7 shows a system block diagram of a camera comprising an automatic focus control detection device of active type according to the present invention.

Reference numeral 10 denotes a CPU (central processing unit) which controls various operations in the camera. Numeral 11 denotes an automatic focus (AF) sensor made of photoelectric elements for focus detection in which the rays passing through the photographic lens 2 are converted into electric signals. The electric signal of the AF sensor 11 is applied to CPU 10. Numeral 12 denotes a motor for moving the photographic lens 2 back and forth for the focus control. Numeral 13 denotes a motor driving circuit for driving said motor 12 in response to the signals from CPU 10. Numeral 14 denotes a trigger circuit which generates signals for ordering the focus detection and release operation to CPU 10, wherein $S_1$ and $S_2$ denote switches for driving the trigger circuit respectively. When the ordinary photographic mode without using a self-timer is set by operating the switching button 4, the switch $S_1$ is turned on in the first step of pressing the release button 3 or the other switch, whereby a focus detection starting signal is transferred from the trigger circuit 14 to CPU 10 via a signal line m. Furthermore, in the second step of pressing the release button 3 or the other switch, the switch $S_2$ is turned on, whereby a shutter release signal is transferred from the trigger circuit 14 to CPU 10 via a signal line n.

On the other hand, when the self-timer operation mode is set by operating the switching button 4, in the second step of pressing the release button 3 or the other switch, the switch S3 for enabling the self-timer is turned on instead of turning on the switch S2. When in the first step of pressing the release button 3, the switch S1 is turned on and the automatic focus control of the photographic lens is executed in a similar way to the ordinary photographic mode.

Reference numeral 15 denotes a self-timer trigger circuit from which a self-timer starting signal for enabling the self-timer is generated by turning on the switch S3. Numeral 16 denotes a timer circuit which counts a predetermined time upon receipt of the self-timer starting signal and produces a high level signal until the predetermined time is lapsed.

Reference numeral 17 denotes a LED driving circuit for turning on the LED 30 at the time of focus detection. When the brightness of the object is lower than a predetermined level, when the focus detection starting signal is generated from the trigger circuit 14, CPU 10 sends out a light emitting signal to the LED driving circuit 17 via a signal line p at the same time of starting the integration of the output signal from the AF sensor 11, whereby the LED driving circuit 17 is turned on and CPU 10 generates a signal which turns the LED 30 on and off in a comparatively long periodical timing in consideration of the movement amount and speed of the photographic lens. Numeral 18 denotes a LED driving circuit for turning the LED 30 on and off in a comparatively short period for example at the time of self-timer operation, and when the high level signal is generated from the timer circuit 16, said LED driving circuit 18 is turned on.

The LED driving circuit may be operable to change the light projecting period of time of the LED corresponding to the ordinary photographic mode or the self timer photographic mode.

Reference numeral 19 denotes a selector circuit in which the signal from the timer circuit 16 is inputted as a control signal, and when a low level control signal is inputted in the selector circuit 19, the LED driving circuit 17 is connected to the LED 30 through the selector circuit 19, on the other hand, when a high level control signal is inputted in the selector circuit 19, the LED driving circuit 18 is connected to the LED 30 through the selector circuit 19. Numeral 20 denotes a trigger circuit which is connected to the timer circuit 16 and sends out a shutter release signal to the signal line n of the trigger circuit 14 when the output of the timer circuit 16 is changed from a high level to a low level, i.e., when the counting of the timer circuit 16 in a predetermined period is finished. Numeral 21 denotes a shutter driving circuit and when a shutter release signal is applied to CPU 10 from the trigger circuit 14 or the trigger circuit 20, the shutter driving circuit 21 is operated by the signal from CPU 10 and the shutter is driven. When the switch S2 is turned on, the shutter release signal is applied from the trigger circuit 14 to CPU 10 via the signal line n.

The control operation of the camera as mentioned above will be described below.

In case the ordinary photographic mode is set by operating the switching button 4, since the self-timer trigger circuit 15 and the timer circuit 16 are not in operation, the output level of the timer circuit 16 is low, therefore, the LED 30 is connected to the LED driving circuit 17 through the selector circuit 19.

When the switch S1 is turned on by pressing the release button 3 or the other switch to the first step, the focus detection starting signal is applied from the trigger circuit 14 to CPU 10 via the signal line m. Then CPU 10 sends out an enabling signal to the AF sensor 11 so as to operate the AF sensor 11. The focus detection signal obtained by the operation of the AF sensor 11 is received by CPU 10. When the brightness of the object is lower than the predetermined level, CPU 10 sends out a light emitting signal to the LED driving circuit 17 via the signal line p at the same time of starting the integration of the output signal from the AF sensor 11. Subsequently, LED 30 is turned on by the operation of the LED driving circuit 17 via the selector circuit 19 so as to project the auxiliary rays to the object. As described above, the auxiliary rays radiated from LED 30 are changed into straight forward rays with sharp directivity and scattering rays through the transparent panel 33 provided in the projection window 5 and are projected to the object. Among the rays projected to the object, the straight forward rays are reflected by the object and the reflected rays are detected by said AF sensor 11. By the arrangement of the above-mentioned automatic focus detection device of active type, the focus detection can be obtained correctly even though the brightness of the object is low.

When the focus detection signal from the AF sensor 11 is applied to CPU 10, which performs the predetermined calculation on the basis of the signal applied to CPU 10 and calculates the defocus amount representing the displacement amount of the photographic lens 2 from the in-focus position. The calculated defocus amount is transferred to the motor driving circuit 13, whereby the motor 12 is driven and the photographic lens 2 is moved to the in-focus position.

Then, upon pressing the release button 3 to the second step, the switch S2 is turned on and the shutter release signal is sent out from the trigger circuit 14 to CPU 10 via the signal line n. Subsequently, CPU 10 sends out a predetermined signal to the shutter driving circuit 21 and the photograph is executed.

In case the self-timer photographic mode is set by operating the switching button 4, the switch S1 is turned on by pressing the release button 3 to the first step as described above, the focus detection signal is sent out to CPU 10 so as to operate the AF sensor 11 in a similar way to the ordinary photographic mode. When pressing the release button 3 or the other set switch to the second step, the switch S3 is turned on, whereby the self-timer trigger circuit 15 sends out the self-starting signal to the timer circuit 16, and which starts the counting of the time and generates a high level signal until the predetermined time is lapsed. By the output of the high level signal from the timer circuit 16, LED 30 is connected to the LED driving circuit 18 through the selector circuit 19 and at the same time the LED driving circuit 18 is turned on. Subsequently, LED 30 is turned on and off in a predetermined period in response to the signal from the LED driving circuit 18. Since a part of the rays lighting on and off is scattered by the grooves V of the transparent panel 33 in the projection window 5, the person seeing the rays lighting on and off can confirm that the self-timer is in operation even though the person does not position in front of the camera. The person also can confirm the same judging from the relatively short period of turning on and off of LED 30.

When the timer circuit 16 counts the predetermined time, the output signal of the timer circuit 16 becomes low level. Then the LED driving circuit 18 is turned off and LED 30 is turned off. Then the shutter release signal is applied from the trigger circuit 20 to CPU 10 at the timing of changing the output signal of the timer circuit 16 from high level to low level, whereby the shutter driving circuit 21 is operated and the photograph is executed.

Figure 4A:
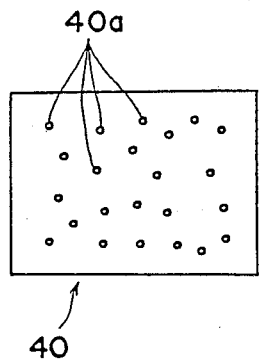
FIG. 4(a) is a front view showing another embodiment of the transparent panel in the projection window of the auxiliary rays in FIG. 3.
Figure 4B:
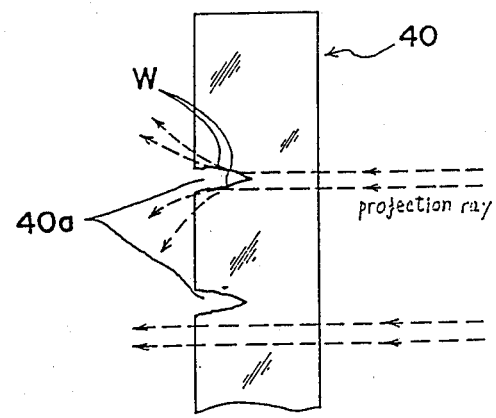
FIG. 4(b) is a cross sectional view of the transparent panel in FIG. 4(a) showing the optical path of the auxiliary rays.

FIG. 4(a) shows another embodiment of the transparent panel 33 shown in FIG. 3. There are formed a lot of minute holes 40a on the whole surface of the transparent panel 40. FIG. 4(b) is an enlarged cross sectional view of the transparent panel 40 in FIG. 4(a), and the rays directing to the hole 40a of the rays projected from LED 30 through the projection lens 31 are irregularly reflected by the wall surfaces W of the holes 40a and subsequently scattered in a wide range to the object On the other hand, the projection rays passing through the plane portion of the transparent panel 40 go straight on and affects similarly to the case of the transparent panel 33 shown in FIG. 3.

Figure 5:
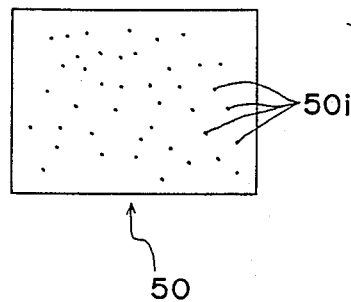
FIGS. 5 and 6 are front views showing other embodiments of the transparent panel in the projection window of the auxiliary rays shown in FIG. 3.
Figure 6:
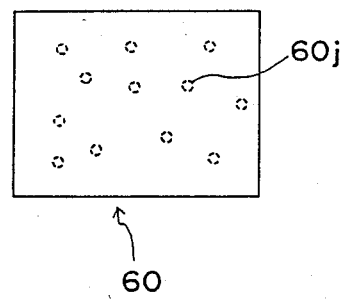

Moreover, FIGS. 5 and 6 show other examples of the transparent panel 33 instead of forming the scattering portions on the surface of the transparent panel. In FIG. 5 there are buried a lot of minute light scattering members 50i inside the transparent panel 50. In FIG. 6, a lot of minute air bubbles 60j for scattering the rays are formed inside the transparent panel 60, whereby both of the straight forward rays and the scattering rays can be obtained at the same time in the similar way of using the transparent panel 40 shown in FIG. 4(a).

In the above-mentioned embodiment, although both the straight forward rays and the scattering rays are obtained by using one transparent panel fitted in the projection window 5, by selecting and projecting the necessary ray of either the straight forward ray or the scattering ray, the waste of the projection rays can be avoided so as to obtain good efficiency. Therefore, there are provided photographic elements having the variation of passage and interception such as electrochromic material respectively in front of the central portion 33a and the peripheral portion 33b of the transparent panel 33 in FIG. 3 and one of the photoelectric elements is made passable and the other interceptive, whereby either the straight forward ray or the scattering ray can be projected. Otherwise, there may be provided a transparent panel comprising two areas of a light scattering portion and a plane portion so that the transparent panel is mechanically moved in response to the switching between the ordinary photographic mode and the photographic mode by using a self-timer and the rays corresponding to each of the modes may be projected to the object.

According to the present invention, since the projection window of the auxiliary ray for the automatic focus control and the display unit of the operation of the self-timer are shared, the camera can be made compact.

WHAT IS CLAIMED IS

1. A camera provided with an ordinary photographic mode and a self timer photographic mode in which an actual photographing is executed after a predetermined delay time from a provision of a trigger signal and a photographing optical system having a movable lens system for projecting an image of an object to be photographed onto a predetermined plane, an in-focus condition of the movable lens system being adjustable by moving said movable lens system, said camera comprising;

a light source accommodated in a body of the camera, a light projecting system for projecting light from said light source to the object, an automatic focus detection device for detecting in-focus condition of said photographing optical system by the light projected from said light projecting system, mode switching means for switching between the ordinary photographic mode and the self timer photographic mode, and a light source driving circuit being changeable in response to operation of the mode switching means between a mode for turning said light source on and off during the delay time of the self-timer photographic mode and a mode for turning on said light source for another predetermined time so as to project the light to the object for detecting the in-focus condition of the photographic optical system in the ordinary photographic mode.

2. The camera according to claim 1, wherein said light source driving circuit is operable to change the light projecting period of time of light source corresponding to the ordinary photographic mode or the self-timer photographic mode.

3. The camera according to claim 1, wherein said light projecting system further comprises a light projection lens and a transparent panel disposed in front of said projection lens, comprising a light scattering portion for scattering a part of the light passed through said light projection lens.

4. The camera according to claim 1, wherein the wavelength of the light projected by the light source is in the range of 680 nm to 720 nm.

* * * * *